United States Patent
Fujiwara (10) Patent No.: US 7,436,538 B2
(45) Date of Patent: Oct. 14, 2008

(54) DISPERSED INPUT AND OUTPUT SYSTEM

(75) Inventor: Akihiko Fujiwara, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 41 days.

(21) Appl. No.: 11/505,873

(22) Filed: Aug. 18, 2006

(65) Prior Publication Data
US 2006/0279797 A1  Dec. 14, 2006

Related U.S. Application Data

(63) Continuation of application No. 09/984,761, filed on Oct. 31, 2001, now abandoned.

(51) Int. Cl.
*G06K 15/00* (2006.01)
(52) U.S. Cl. .................. 358/1.15; 358/1.1; 358/296; 358/401; 358/450; 399/8; 399/75; 399/77; 399/81
(58) Field of Classification Search .............. 358/1.1, 358/1.15, 296, 401, 450; 399/8, 75, 77, 81
See application file for complete search history.

(56) References Cited

U.S. PATENT DOCUMENTS

| | | | | |
|---|---|---|---|---|
| 5,991,516 A | * | 11/1999 | Desmond et al. | 358/1.17 |
| 6,348,972 B1 | * | 2/2002 | Taniguchi et al. | 358/1.15 |
| 6,625,406 B2 | * | 9/2003 | Suzuki et al. | 399/75 |
| 6,778,288 B1 | | 8/2004 | Ogaki et al. | |
| 6,795,210 B1 | | 9/2004 | Fujiwara | |
| 2002/0101604 A1 | | 8/2002 | Mima et al. | |

\* cited by examiner

*Primary Examiner*—David K Moore
*Assistant Examiner*—Peter K Huntsinger
(74) *Attorney, Agent, or Firm*—Foley & Lardner LLP (57) ABSTRACT

There is disclosed a dispersed input and output system adapted to instruct the execution of a dispersed divided input operation at a document input and output device, perform control to cause a plurality of document input and output devices other than the document input and output device to cooperatively carry out dispersed divided input operations, and register the operations as one job in a document handling function at the end.

16 Claims, 11 Drawing Sheets

DISPERSED INPUT AND OUTPUT SYSTEM

CROSS-REFERENCE TO RELATED APPLICATIONS

The present application is a continuation of U.S. application Ser. No. 09/984,761, filed Oct. 31, 2001, incorporated herein by reference in its entirety.

BACKGROUND OF THE INVENTION

The present invention relates to control for equipment connected to a network, and more particularly, it relates to a dispersed input and output system for performing dispersed input and output processing for the equipment.

Conventionally, in registering a document composed of a plurality of sheets as a job in a document handling function, an input operation has been carried out taking a great deal of time, if the document is composed a large number of sheets. In the case that color sheets as well as black and white sheets are mixed, these sheets are treated as similar content characteristics, or alternatively, the sheets are divided in accordance with different content characteristics to perform a registration operation, and after the registration, the divided jobs are integrated.

As described above, it is now assumed that a certain document is composed of a plurality of sheets. When such a document is registered as a job in the document handling function, an input/registration operation takes a great deal of time, if the document is composed of a large number of sheets. In addition, if the sheets having different content characteristics, such as color, and black and white sheets, are mixed, it is impossible to change attributes including input conditions, and so on. For example, the following problems have been inherent. If the first half of the document is composed of a large number of monochromatic sheets, then a black and white, and low-resolution input from a high-speed input device is proper. On the other hand, if the latter half of the document is composed of color sheets, then a color and high-resolution input from the input device is proper. Such a document is first divided into bundles, entered from one or a plurality of devices, and registered as a plurality of jobs. Then, these bundles are integrated by given means (e.g., application for processing an image), and lastly registered as one job. It is possible to employ such a method. However, it necessitates an operation for integrating the jobs. In addition, information before the job integration may be lost, making it impossible to obtain an output result matching the device characteristic (e.g., black and white, or color), and a document state (e.g., double-sided sheet) of the input time, when an output is made later. Furthermore, if one failure or another occurs in a document input and output device during its input operation, information that has been entered becomes invalid, necessitating the re-execution of job registration.

BRIEF SUMMARY OF THE INVENTION

It is an object of the present invention to provide a dispersed input and output system capable of easily registering a document composed of a plurality of sheets having different content characteristics in a document handling function as a job.

In accordance with an aspect of the present invention, there is provided a disperse input and output system, comprising: a plurality of document input and output devices connected through a network; means for instructing the execution of a dispersed divided input operation at a first document input and output device when one document is divided into a plurality of bundles and subjected to a dispersed divided input operation by using the plurality of document input and output devices on the system; and means for controlling the plurality of document input and output devices other than the first document input and output device to cooperatively carry out dispersed divided input operations, and registering the operations as one job at the end.

According to the dispersed input and output system of the present invention, after the simultaneous execution of simultaneous dispersed divide input operations is instructed at the first document input and output device, an input reservation state is set through a device control function of a plurality of document input and output devices other than the first document input and output device instructed by the first document input and output device to cooperatively operate, and a registration operation is continued without performing any other operations on the plurality of document input and output devices other than the first document input and output device.

According to the dispersed input and output system of the present invention, for performing a divided input operation with a time difference by using the plurality of document input and output devices, means is provided for instructing the execution of a time difference divided input operation at the first document input and output device, and means is provided for preparing templates to continue a job registration operation, for the plurality of document input and output devices other than the first document input and output device instructed by the first document input and output device to cooperatively operate.

According to the dispersed input and output system of the present invention, job templates are prepared for the plurality of document input and output devices other than the first document input and output device and, when job registration operations are continuously carried out at the plurality of document input and output devices other than the first document input and output device, and completed, the unnecessary templates prepared for the plurality of document input and output devices other than the first document input and output device are automatically deleted.

According to the dispersed input and output system of the present invention, for performing a divided input operation with a time difference by using the plurality of document input and output devices, means is provided for recording a state where registration is incomplete and still continuously possible, when a job is entered at the first document input and output device, and a standby state of the job for continued registration is indicated, means is provided for obtaining information regarding jobs of incomplete registration state for the plurality of document input and output devices other than the first document input and output device, and means is provided for carrying out a registration operation continuously for the jobs.

According to the dispersed input and output system of the present invention, when the input operation is impossible any more at the first document input and output device, entered jobs are registered as one job by a controller capable of continuously performing a dispersed divided input operation for the plurality of document input and output devices other than the first document input and output device.

According to the dispersed input and output system of the present invention, means for instructing the controller capable of continuously performing the dispersed divided input operation to simultaneously execute a dispersed divided input operation from the first document input and output device, and means is provided for setting an input reservation state through the device control functions of the plurality of document input and output devices other than the first document input and output device instructed by the first document input and output device to cooperatively operate, and continuing a registration operation without performing any other operations on the plurality of document input and output devices other than the first document input and output device.

According to the dispersed input and output system of the present invention, means is provided for instructing execution of a dispersed divided input operation with a time difference at the first document input and output device, when the input operation is impossible any more at the first document input and output device, and means is provided for preparing templates to continue job registration operations for the plurality of document input and output devices other than the first document input and output device instructed by the first document input and output device to cooperatively operate.

According to the dispersed input and output system of the present invention, when templates are prepared for the plurality of document input and output devices other than the first document input and output device, job registration operations are continuously carried out at the plurality of document input and output devices other than the first document input and output device and, when jobs are completed, the unnecessary templates prepared for the plurality of document input and output devices other than the first document input and output device are automatically deleted.

According to the dispersed input and output system of the present invention, means is provided for indicating that a job being executed by the first document input and output device is on standby for continued registration, when the input operation is impossible any more at the first document input and output device, means is provided for recording an incomplete state of the job, thus enabling continued registration, and means is provided for obtaining information regarding jobs of an incomplete registration state for the plurality of document input and output devices other than the first document input and output device, and performing continued job registration for the jobs.

According to the dispersed input and output system of the present invention, means is provided for also managing information regarding a document input and output device used at time of input when the jobs divided and entered from the plurality of document input and output devices are managed, and means is provided for determining and outputting an output device matching a device characteristic of the input time based on information of the document input and output device used at the time of input, when the jobs are outputted.

According to the dispersed input and output system of the present invention, when the jobs are divided and entered from the plurality of document input and output devices, the jobs are edited by a bundle unit before the jobs are lastly registered.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Next, the preferred embodiments of the present invention will be described with reference to the accompanying drawings.

Hereinbelow, "page" in a sentence means one surface, front or back, of one sheet of a document; "sheet" one sheet of the document; "job" a document unit registered for input/output; and "user" a walkup user, who comes before a device, and performs a predetermined operation.

Figure 1:
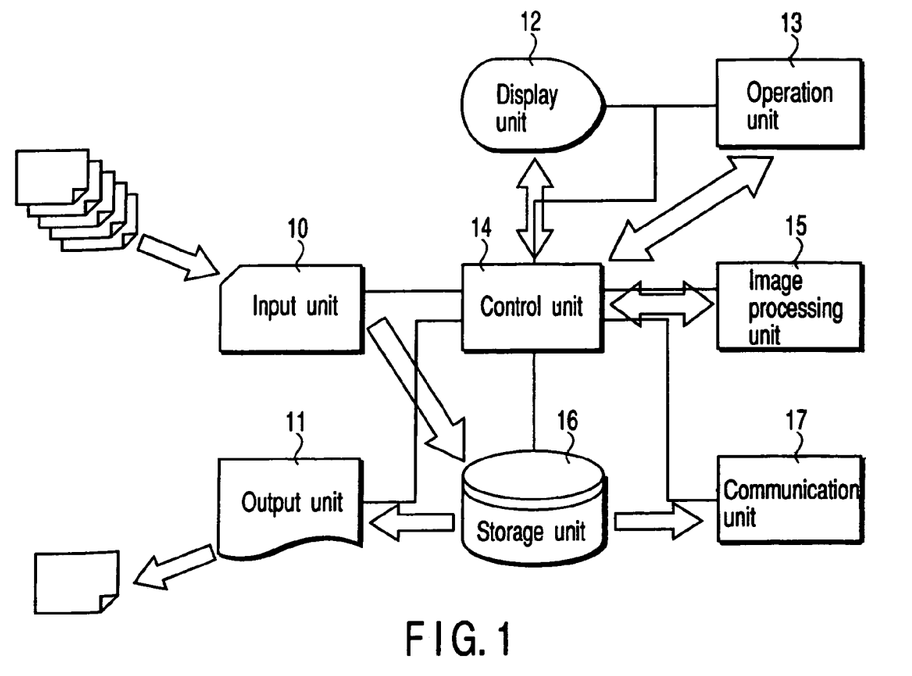
FIG. 1 is a view schematically showing a system according to an embodiment of the present invention.

As shown in FIG. 1, the system of the present invention comprises: a document input unit 10 (e.g., MFP scanner unit); a document output unit 11 (e.g., MFP printer unit); a display unit 12 (e.g., combination panel); an operation panel 13 as an instruction device (e.g., touch panel); and a control unit 14 (e.g., MFP controller). The control unit 14 includes: a device control function (e.g., mechanical controller); a job management function (e.g., input setting management module); a document handling function (e.g., image information filing application enabling an electronic document to be stored, edited, and so on); and a network device management function (e.g., SNMP management tool). The system of the present invention further comprises at least: a storage unit 16 (e.g., MFO controller internal HDD); a communication unit 17 (e.g., LAN interface); and an image processing unit 15 (e.g., image compression module).

Figure 2:
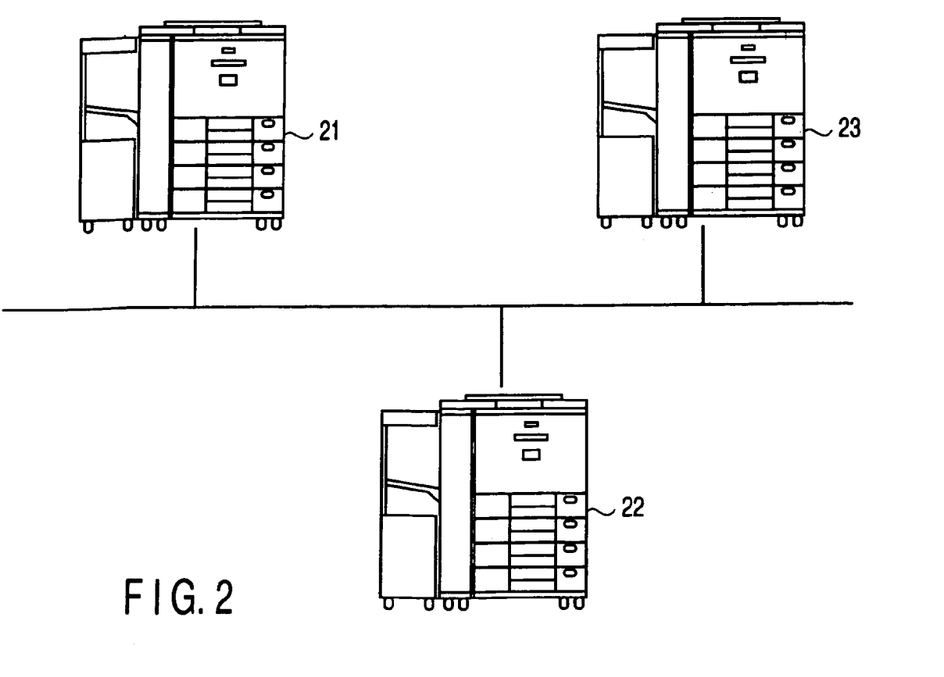
FIG. 2 is a view showing the system of the embodiment, where a plurality of document input and output devices are interconnected through a network.
Figure 3:
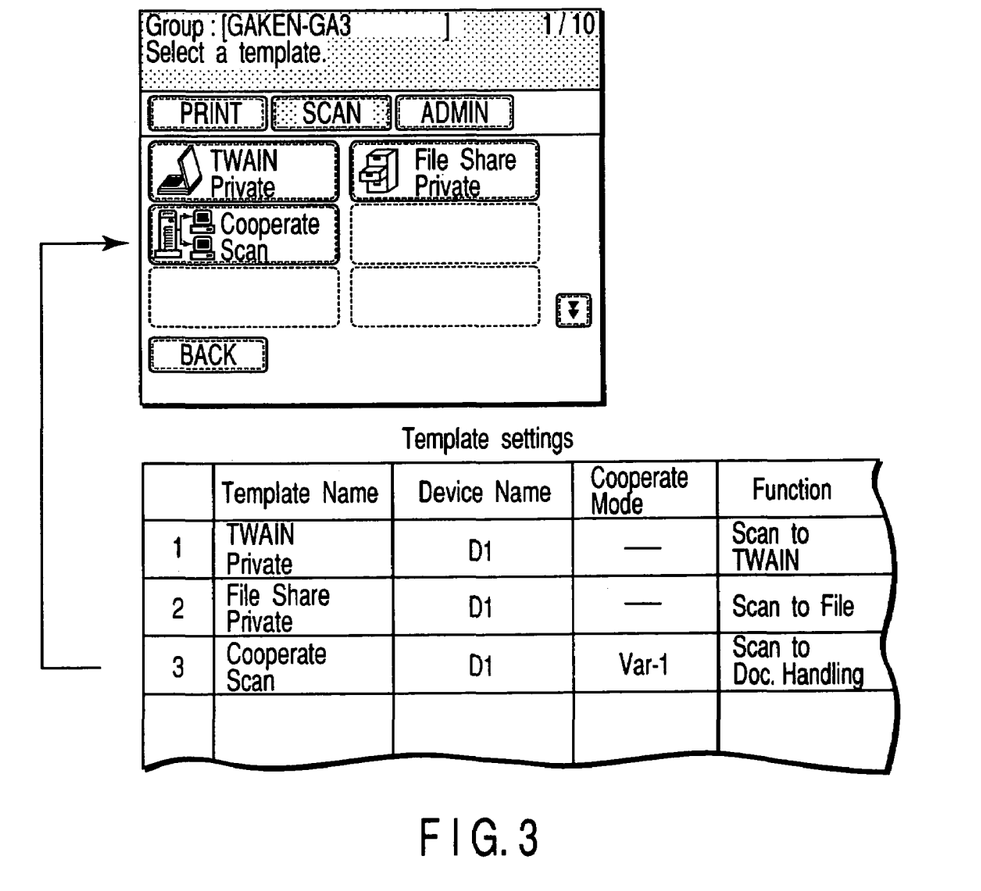
FIG. 3 is a view showing a screen when an icon (template) having an attribute regarding a job of the embodiment.

The embodiment of the present invention is directed to the system, as shown in FIG. 2, where a plurality of document input and output devices (21 to 23) are connected through a network. The job management function of each of the document input and output devices (21 to 23) serves, in order to easily register an entered document as a job, to display an icon (see template of FIG. 3, hereinafter) having an attribute, and cause a user to make selection by the operation unit 13.

Figure 4:
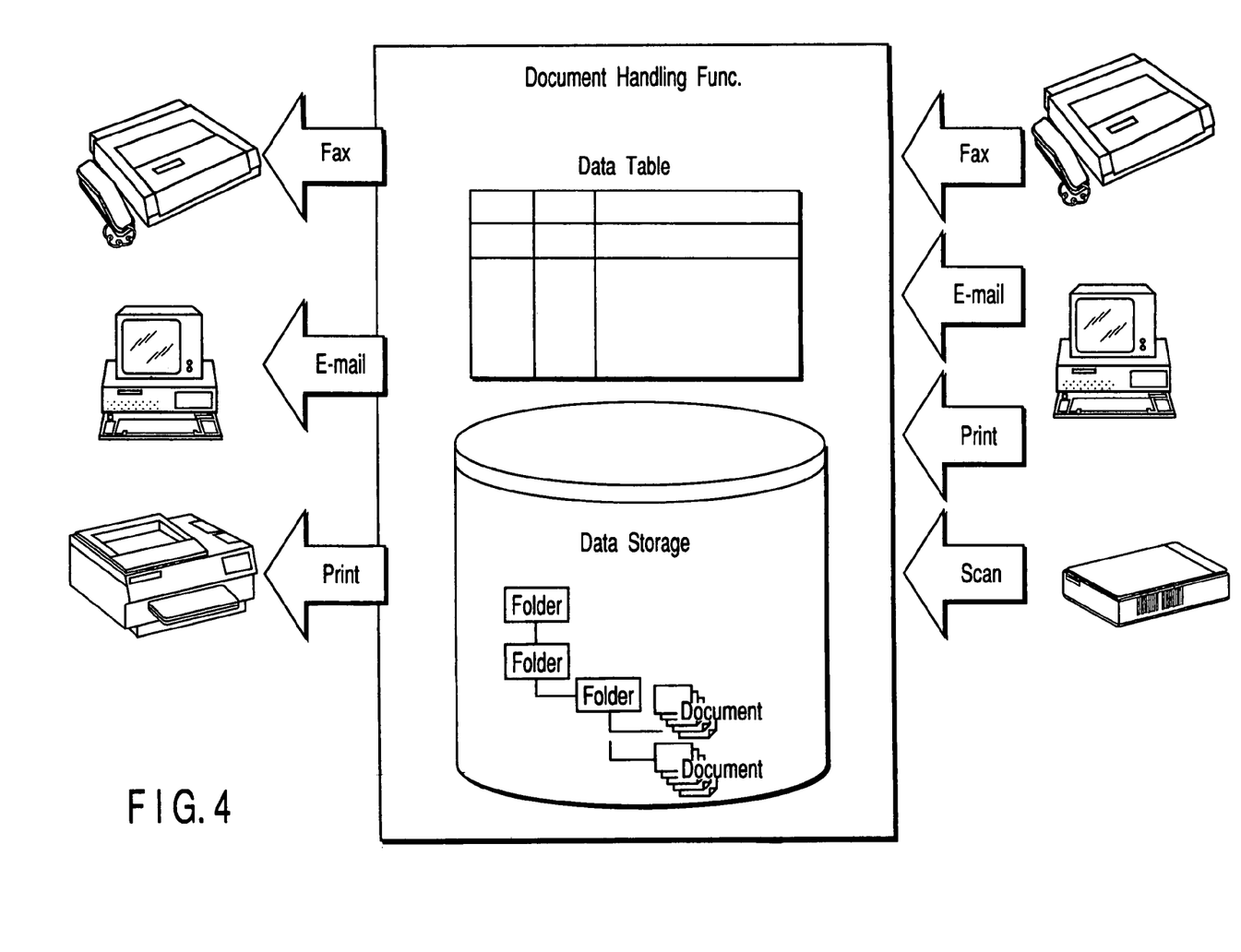
FIG. 4 is a view showing a storage operation carried out by a document handling function of the embodiment to store a document entered from the document input and output device as a job.

First, consideration is given to the operation of entering a given document, and registering it as a job. The registration operation may be one selected from storage as a file, registration under the control of the document handling function, and so on. Here, as shown in FIG. 4, the document handling function stores a document entered from the document input and output device as a job; stores a document transmitted from an external unit (e.g., Fax document, e-mail attached document file or the like) as a job; outputs the stored job from the document input and output device; transmits the stored job to the external unit (e.g., transmitted as Fax document, e-main attached document file, or the like); and so on.

There is available a system, where a plurality of document input and output devices having the above-described functions are connected through a network. When one document is divided into a plurality of bundles and dispersed divided input is performed by using the plurality of document input and output devices on the system, first instruction is made to execute a dispersed divided input operation by a predetermined "document input and output device 1", and control is performed to cause the plurality of "document input and output devices 1 to n" to cooperatively execute dispersed divided input operations. Accordingly, the operations can be registered in the document handling function as one job at the end.

When dispersed divided input operations are carried out simultaneously by using the plurality of document input and output devices, first the simultaneous execution of dispersed divided operations is instructed by the predetermined "document input and output device 1". Then, an input reservation state is set through the device control functions of the other "document input and output devices 2 to n" instructed by "the document input and output device 1" to cooperatively operate, and a registration operation is continued without generating any other operations on the devices.

When divided input operations are performed with a time difference by using the plurality of document input and output devices, first the execution of the time difference divided input operations is instructed by the predetermined "document input and output device 1". Then, templates for enabling the job registration operation to continue are prepared for one or more "document input and output device n to . . . " instructed by "the document input and output device 1" to cooperatively operate.

It is now assumed that job templates have been prepared for the plurality of "document input and output devices n to . . . ". If the hob registration operation is continuously carried out by "the document input and output device n", and the job is completed, unnecessary templates prepared for the other "document input and output devices . . ." are automatically deleted.

When divided input operations are performed with time difference by using the plurality of document input and output devices, first a job is entered by the predetermined "document input and output device 1", and it is indicated that the job is on standby for continuous registration. Then, a state where the job is not completed for registration, and can be continuously registered is recorded. Accordingly, the plurality of "document input and output devices 1 to . . . " can obtain information regarding the job uncompleted for registration, and the registration operation can be easily carried out continuously for the job.

When one failure or another occurs in the predetermined "document input and output device 1" in the middle of the input operation, making it impossible to carry out the input operation any more therein, control is performed for the other "document input and output devices 2 to n" so as to continuously carry out the dispersed divided input operations. Accordingly, the operations can be registered by the job management function as one job at the end.

When "the document input and output device 1" can no longer continue its input operation, the simultaneous execution of dispersed divided input operations is instructed by "the document input and output device 1". Then, input reservation state is set through the device control functions of the other "document input and output devices 1 to . . . " instructed by "the document input and output device 1" to cooperatively operate, and the registration operation is continuously carried out without generating any other operations on the devices.

When "the document input and output device 1" can no longer continue its input operation, the time difference execution of dispersed divided input operations is instructed by "the document input and output device 1". Then, templates for enabling the job registration operation to continue are prepared for one or more "document input and output device n" or "document input and output devices n to . . . " instructed by "the document input and output device 1" to cooperatively operate.

When there are templates prepared for the plurality of "document input and output devices n to . . . ", if the job registration operation is continued by "the document input and output device n", and the job is completed, the unnecessary templates prepared for the other "document input and output devices . . . " are automatically deleted.

When "the document input and output device 1" can no longer continue its input operation, it is indicated that the job being executed by "the document input and output device 1" is on standby for continuously job registration. Then, a state where the job is not completed for registration, and can be continuously registered is recorded. Accordingly, the plurality of "document input and output devices 1 to . . . " can obtain information regarding the job uncompleted for registration, and the registration operation can be easily carried out continuously for the job.

The jobs divided and entered from the plurality of document input and output devices are managed by the document handling function. In this case, the information of the document input and output device used at the time of input is also managed. Further, when an output is made from the document handling function, based on the information of the document input and output device used at the time of input, an output device matching a device characteristic at the time of input can be determined, and the output can be divided.

When jobs are divided and entered from the plurality of document input and output devices, the jobs can be edited by a bundle unit before the last registration.

Next, the first embodiment of the present invention will be described in more detail.

Figure 5:
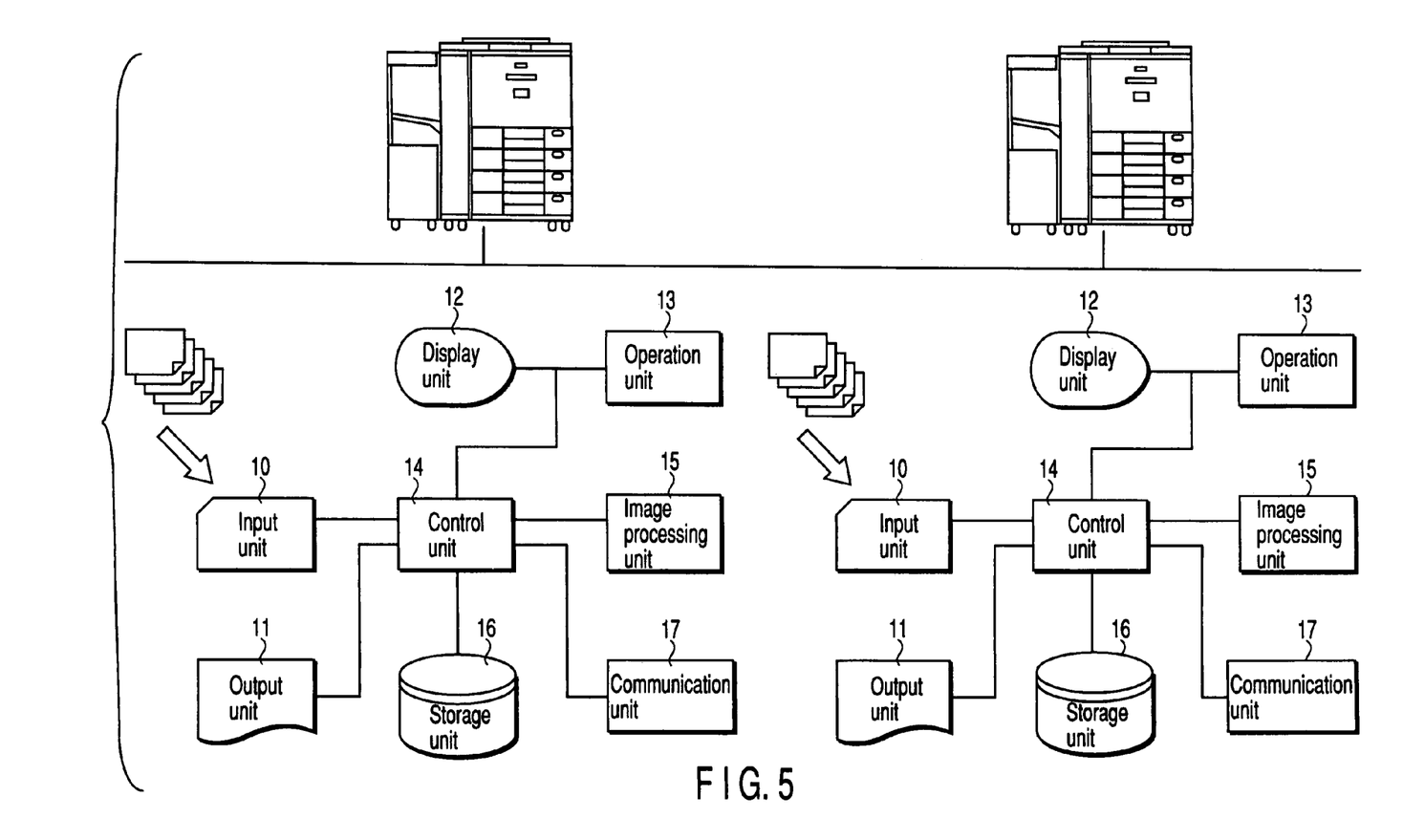
FIG. 5 is a view illustrating the system of the embodiment, where document input and output devices 1 and 2 are connected.
Figure 6:
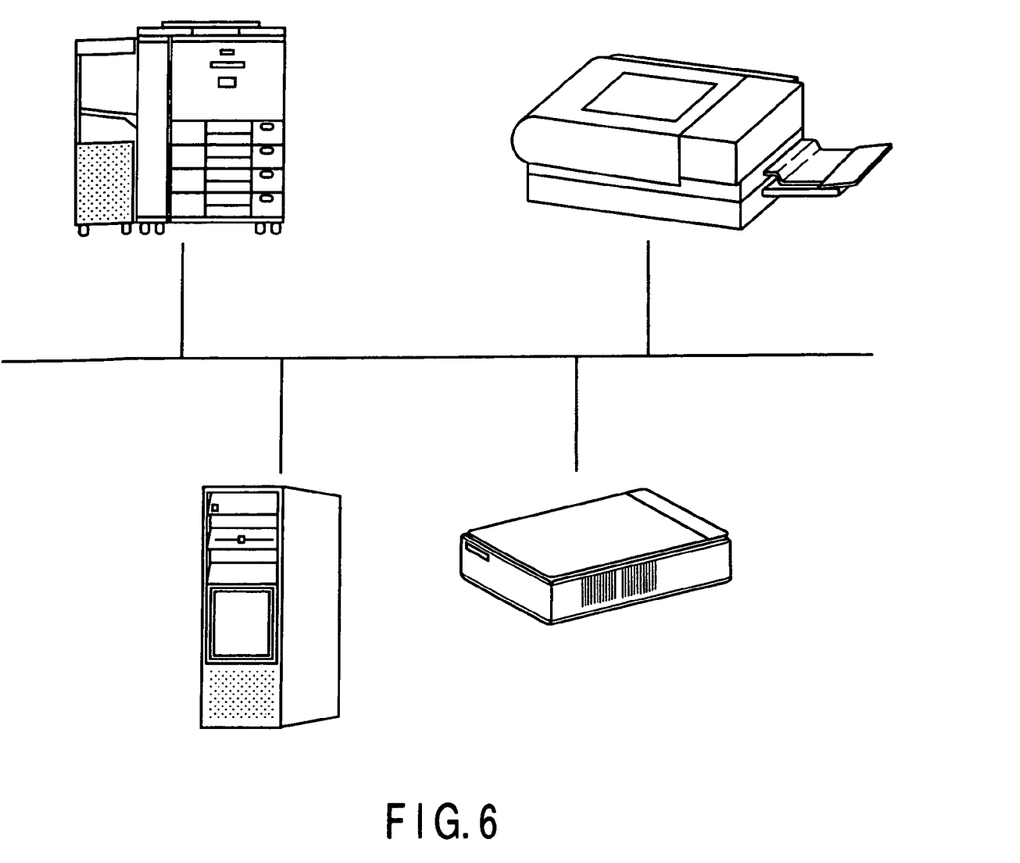
FIG. 6 is a view illustrating the system of the embodiment, where a device having a single function is connected.

FIG. 5 illustrates the system of the embodiment, where the document input and output devices 1 (=D1) and 2 (=D2) are connected. Another form of connection may be possible, like that shown in FIG. 6, where a device having a single function is connected. The D1 shown in FIG. 5 a high-speed processing MFP having an input/output limited to black and white, and the D2 is an MFP capable of performing an input/output operation by color.

It is now assumed that the user enters a document by the D1, and registers it as a job. The user then divides the document into two bundles, i.e., a bundle 1 including many black and white sheets in the first half, a processing speed for one sheet at the image processing unit 15 being high, and a bundle 2 having a small number of color sheets in the latter half, processing for one sheet at the image processing unit 15 taking a long time, and then enters the bundles.

Figure 7:
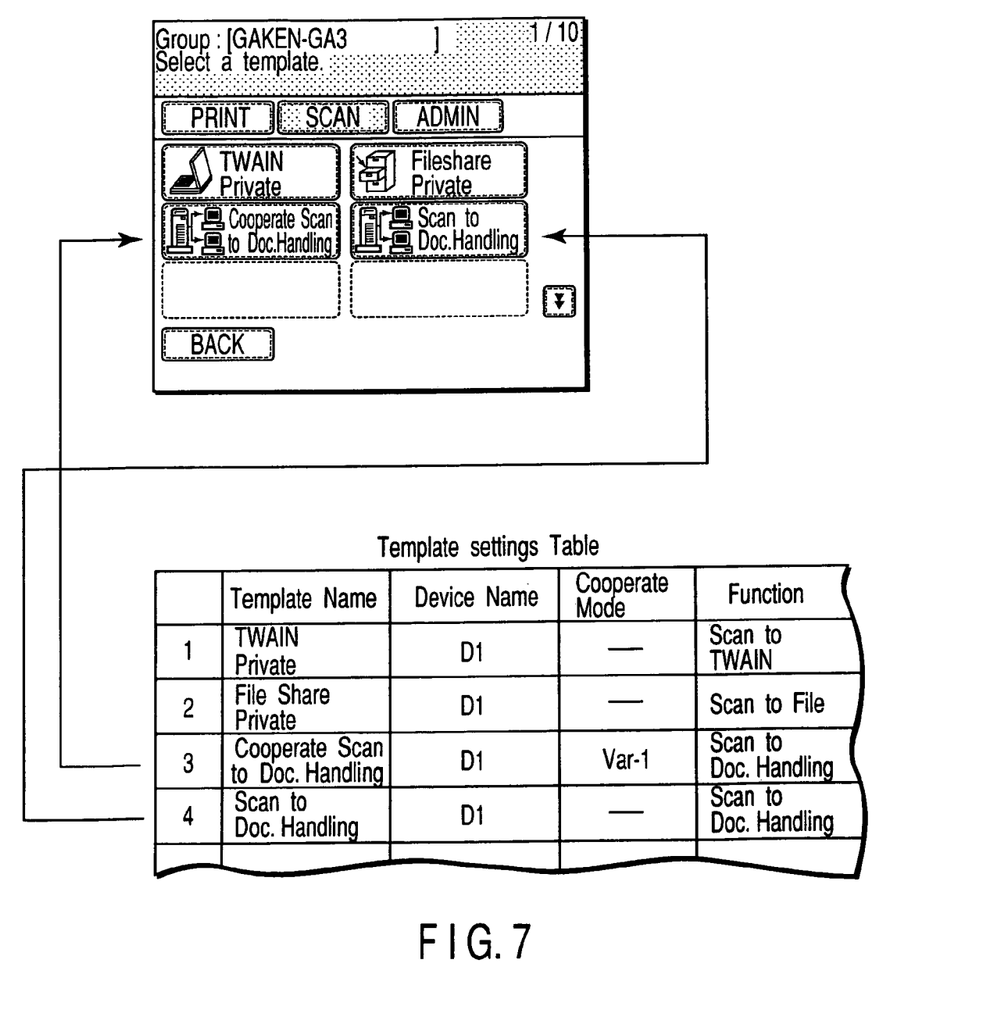
FIG. 7 is a view showing a screen when a divided input is instructed in an actual input operation carried out without any presetting in the template of the embodiment.

First, the user prepares a template beforehand, and sets various attributes therein. According to the embodiment of the present invention, the user divides the document and then enters the divided document, but the instruction of such divided input can also be set as attribute. In addition, without any presetting in the template, divided input can be instructed when an input operation is actually carried out (see FIG. 7).

Regarding the instruction of such divided input, the following variations are possible depending on the methods of divided input. First, Var-1 is a method of carrying out a dispersed divided input operation by reserving the other document input and output device (a plurality can be selected) to an input mode, and simultaneously using the plurality of devices. Var-2 is a method of automatically preparing a template inheriting the original template setting information, selecting document input and output devices to be perform cooperative operations, and transferring the template to the job management function of each of the devices. Var-3 is a method of adding, to the job itself, information indicating the continued operation of the divided input, and then registering it.

Figure 8:
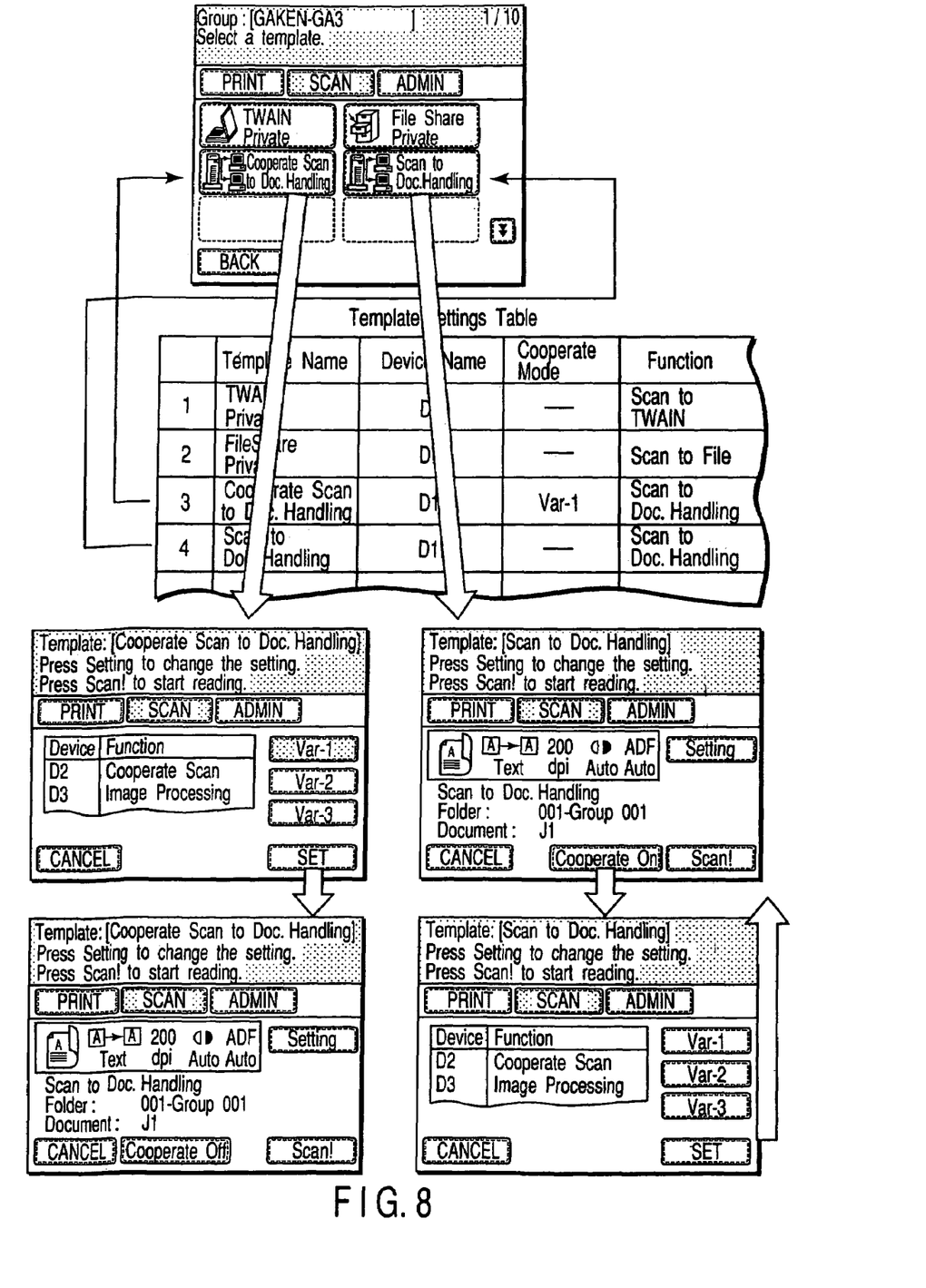
FIG. 8 is a view showing a list of document input and output devices to be controlled to cooperatively operate, displayed on a D1 display unit, when a divided input is specified as Var-1 in an operation unit 3 of a D1 of the embodiment.
Figure 9:
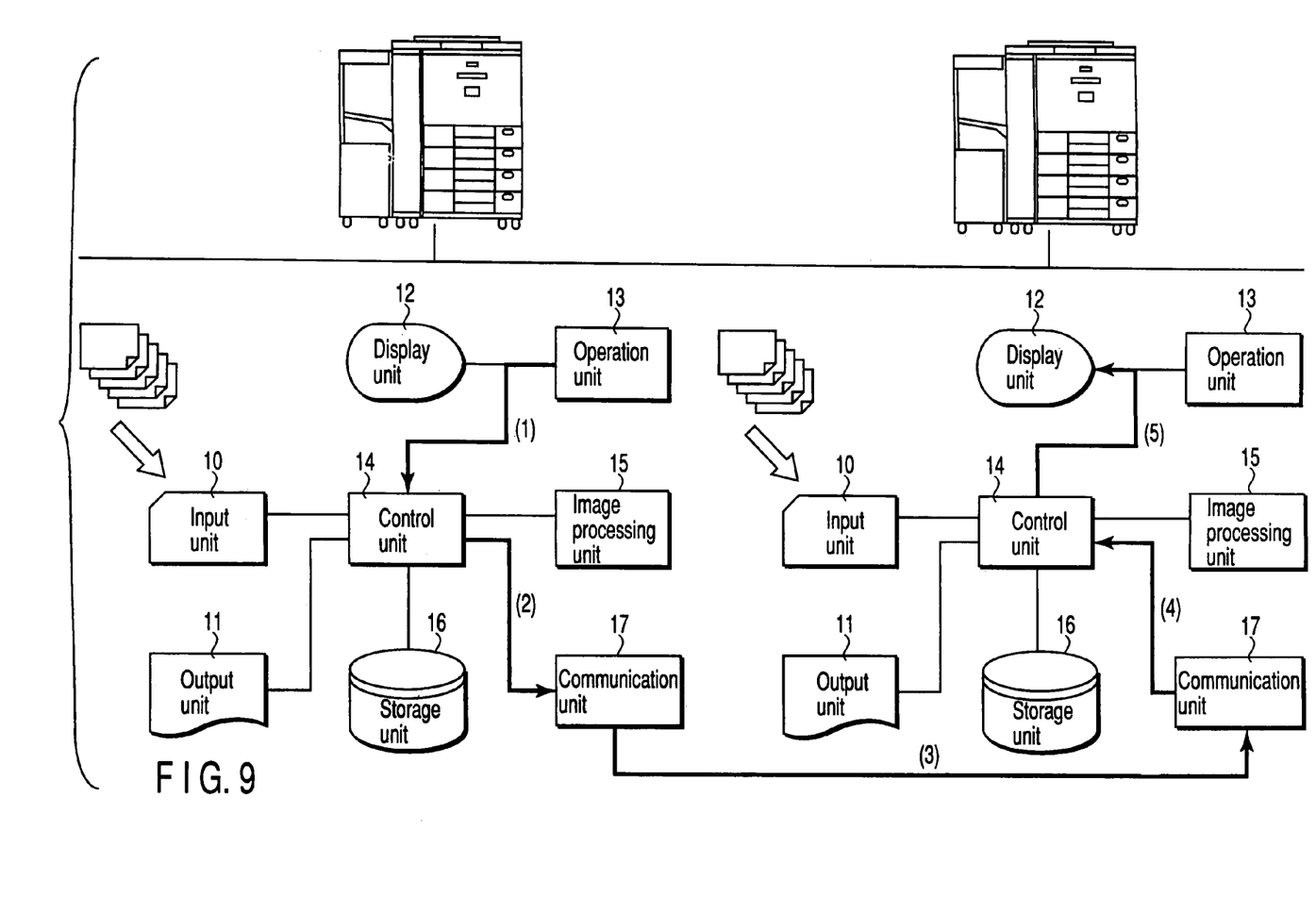
FIG. 9 is a view illustrating a process of the embodiment, where a user selects a D2 from the list, and template setting information having been selected at the D1 is notified.

Then, when the user selects the template having the divided input attribute set to the Var-1, or when the divided input is instructed to the Var-1 in the operation unit 13 of the D1, the following operation is carried out under the control of the controller 14. A list of document input and output devices to be controlled to cooperatively operate is displayed on the display unit 12 of the D1 (see FIG. 8). The user selects a proper device from the list. In the described case, the D2 is selected. The D2 is notified of the cooperative operation request made at the Var-1 through the communication unit 17. At the same time, the setting information of the template previously selected at the D1 is also notified (see FIG. 9).

Figure 10:
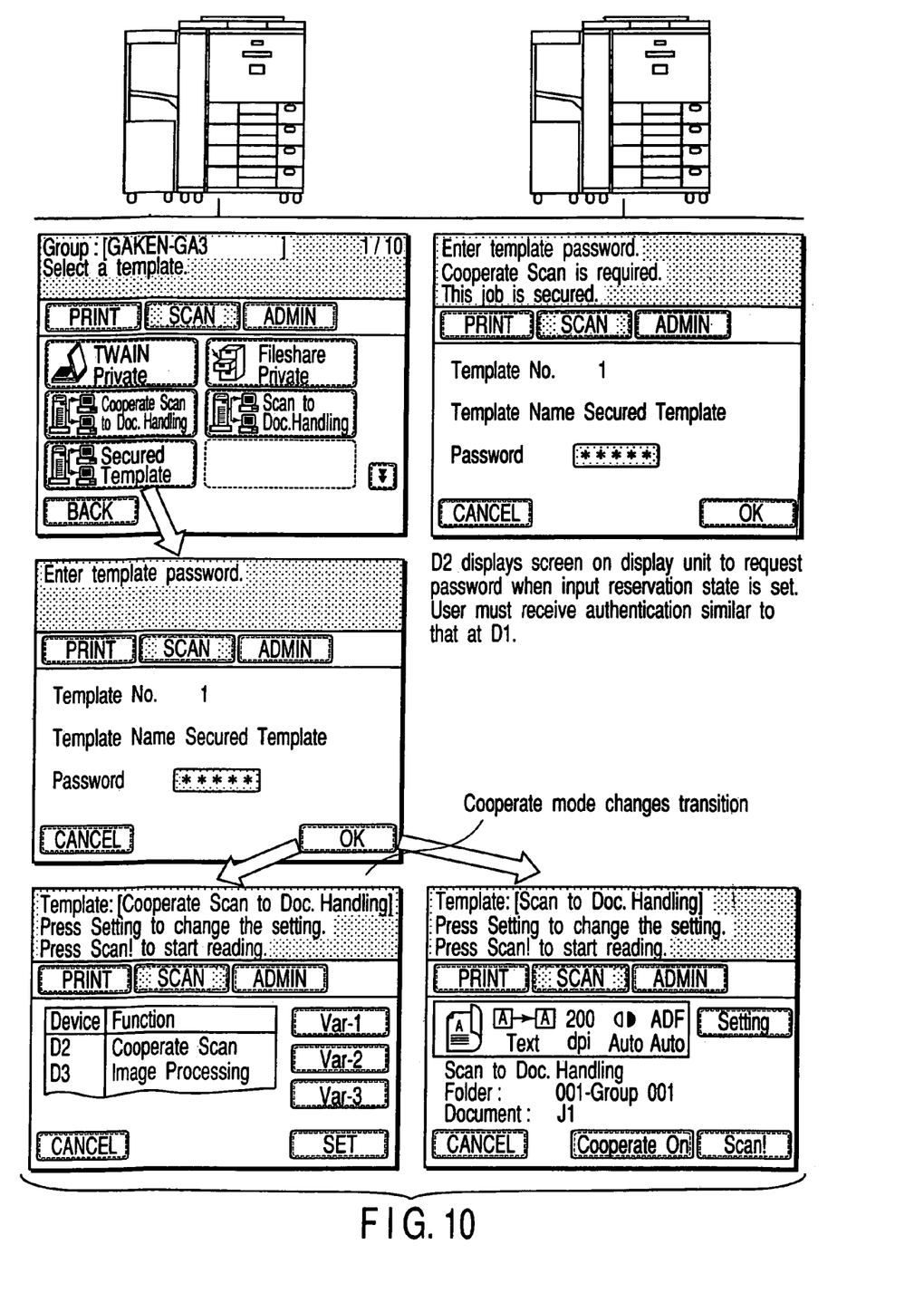
FIG. 10 is a view illustrating a process of the embodiment, where setting information registered in a specific folder of the document handling function, or password information thereof when there is security provided for use of the template, is notified, a screen is displayed on a D2 display unit to request a password when there is security provided for the template and, when a password matching authentication of the D1 is entered, template information is displayed understanding that it has been authenticated.

Thus, at the D2, a job attribute common to the D1 can also be provided. For example, setting information to be registered in the specific folder of the document handling function, or password information when there is security set for the use of the template, is notified. In addition, when there is security set for the template, a screen is displayed on the display unit 12 of the D2 to request a password. When a password identical to authentication at the D1 is entered, template information is displayed understanding that it has been authenticated (see FIG. 10).

When the start of an input operation is instructed by the operation unit 13 of the D1, the input operation I is started at the input unit 10 of the D1. Similarly, when the start of input operation is instructed by the operation unit 13 of the D2, the input operation is started at the input unit 10 of the D2.

Such documents entered in the dispersed manner are, registered as one job j1 in the specified document handling function on the network.

Then, when the user selects the template having a divided input attribute set to Var-2, or when the divided input is set to Var-2 in the operation unit 13 of the D1, the following operation is carried out under the control of the controller 14. A list of document input and output devices, to which template information can be to copied/transferred, is displayed on the display unit 12 of the D1. Then, the user selects a proper device from the list. In the described case, the D2 is selected.

The D2 is notified of the cooperation operation request made at the Var-2 through the communication unit 17. At the same time, the template selected by the D1 is copied and transferred to the D2. Accordingly, at the D2, a job attribute common to the D1 can be provided. For example, setting information to be registered in the specific folder of the document handling function, or password information when there is security set for the use of the template, is notified. When there is security set for the template, a screen is displayed on the display unit 12 of the D2 to request a password when the template transferred to start the input operation at the D2 is selected. When a password identical to authentication at the D1 is entered, template information is displayed understanding that it has been authenticated. When the start of an input operation is instructed by the operation unit 13 of the D1, the input operation is started at the input unit 10 of the D1. Similarly, when the template subsequently transferred by the operation unit 13 of the D2 is selected, and then the start of the input operation is started, the input operation is started at the input unit 10 of the D2.

The documents entered in the dispersed manner are then registered as one job J2 in the specified document handling function on the network. In addition, when templates are copied and transferred to a plurality of document input and output devices, since the completion of a job at a certain document input and output devices makes unnecessary the templates transferred to other devices, these templates are automatically deleted.

Figure 11:
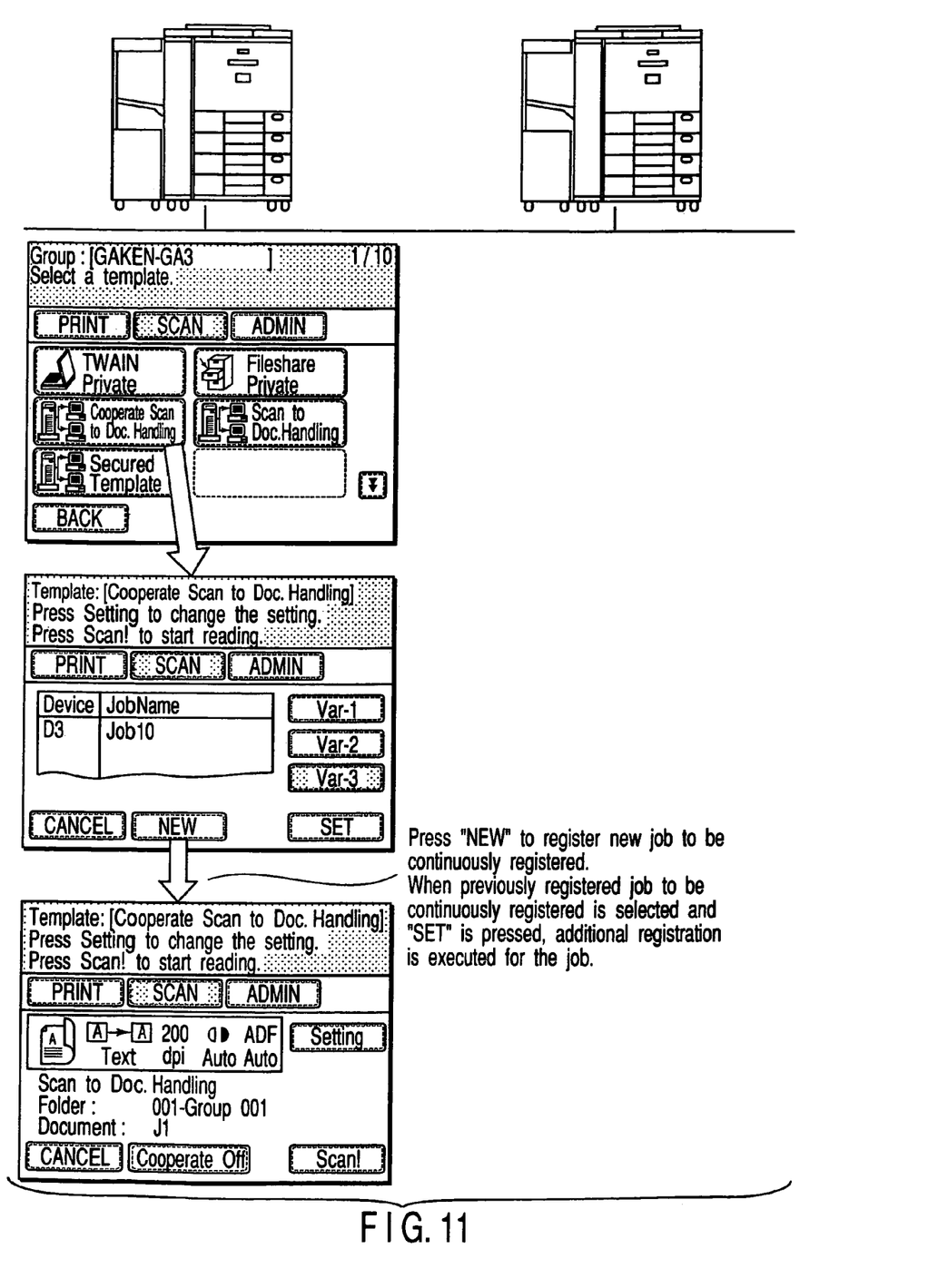
FIG. 11 is a view illustrating a process of the embodiment, where when the user selects a template having a divided input attribute set as Var-3 or a divided input is specified as Var-3 in the D1 operation unit, if the user tries to execute additional registration continuously to the job after a D2 job management function adds information indicating that the job is continuing a divided input, the D2 obtains information regarding a job to be additionally registered from the D1 through a communication unit, and a list of jobs to be additionally registered is displayed on the D2 display unit.

Then, when the user selects the template having the divided input attribute set to Var-3, or when the divided input is instructed to be Var-3 in the operation unit 13 of the D1, the following operation is carried out under the control of the controller 14. The job management function of the D1 adds information indicating the continued operation of the divided input. When the user executes additional registration continuously for the job at the D2 later, the D2 obtains information regarding a job to be additionally registered from the D1 through the communication unit 17. Then, a list of jobs to be additionally registered is displayed on the display unit 12 of the D2 (see FIG. 11). If there are jobs to be additionally registered in the other connected document input and output devices, a list thereof are also displayed. The user selects a proper job from the list. In the described case, J3 is selected. To continue the input operation at the D2, the setting information of the template selected when the first job registration has been carried out is applied. Accordingly, at the D2, a job attribute common to the D1 can also be provided. For example, setting information to be registered in the specific folder of the document handling function, or password information when there is security set for the use of the template, is notified. When there is security set for the template, a screen is displayed on the display unit 12 to request a password when the job 3 is selected to carry out the input operation at the D2. In addition, when a password identical to authentication at the D1 is entered, template information is displayed understanding that it has been authenticated.

Further, when the start of an input operation is instructed by the operation unit 13 of the D1, the input operation is started at the input unit 10 of the D1. Similarly, when the start of an input operation is instructed after the selection of a job by the operation unit 13 of the D2, the input operation is started at the input unit 10 of the D2.

The job J1 registered in the divided manner at the D1 and D2 is managed each by the document handling function. Now, consideration is given to the case of outputting the job J1 from the document handling function of the D1.

It is understood by the document handling function of the D1 that the J1 has been registered together with the information of the document input and output device of the input time, the first half bundle 1 of the J1 is a document entered by the D1, and the latter half bundle 2 is a document entered by the D2. Then, when an output request is made for the J1, the document handling function of the D1 obtains the device information of the input time. In addition, in the case of the J1, the first half bundle 1 is determined to be one entered from the D1 based on the information of the input time, and the network device control function of the D1 makes determinations as to whether the D1 is usable or not at this time. If usable, the D1 is instructed to make an output.

The latter half bundle 2 is determined to be one entered from the D2 based on the information of the input time, and the network device control function of the D1 makes determination as to whether the D2 is usable or not at this time. If usable, then the D2 is instructed to make an output. When the document input and output devices of the input time are similarly present on the network at the time of output, an output is requested to each of the document input and output devices of the input time.

However, if the document input and output devices of the input time are not present, then the network device control function of the D1 investigates the characteristic of a device usable at present time. If the result of the investigation shows that the characteristic is compatible to the document input and output device of the input time, an output is requested to the device. If the result shows the incompatibility of any devices, no outputs are requested, and the information thereof is notified to the user who made the output instruction. Processing is employed, e.g., requesting a present default device to make an output, and notifying the information thereof to the user who made the output instruction. In addition, the type of processing to be selected can be preset.

When the documents are divided and entered at the D1 and the D2, an input operation can be performed for a predetermined bundle by a plurality of times. For example, resolution may be changed in several ways, and only a proper one may be selected and registered at the end depending on the information size of an obtained image. Thus, when a divided input operation is carried out by each of Var-1 to Var-3 methods, a list of values regarding the information sizes of images or the like should be enabled to be seen for every bundles. By displaying/editing the list, the user can carry out an editing operation such as the select of jobs to be lastly registered for every bundles, or the rearrangement of the order of the bundles.

Next, description will be made of the system of the second embodiment of the present invention, where the document input and output devices 1 (=D1) and 2 (=D2) shown in FIG. 5 are connected. Another possible form of connection is one like that shown in FIG. 6, where a device having a single function is connected.

Figure 12:
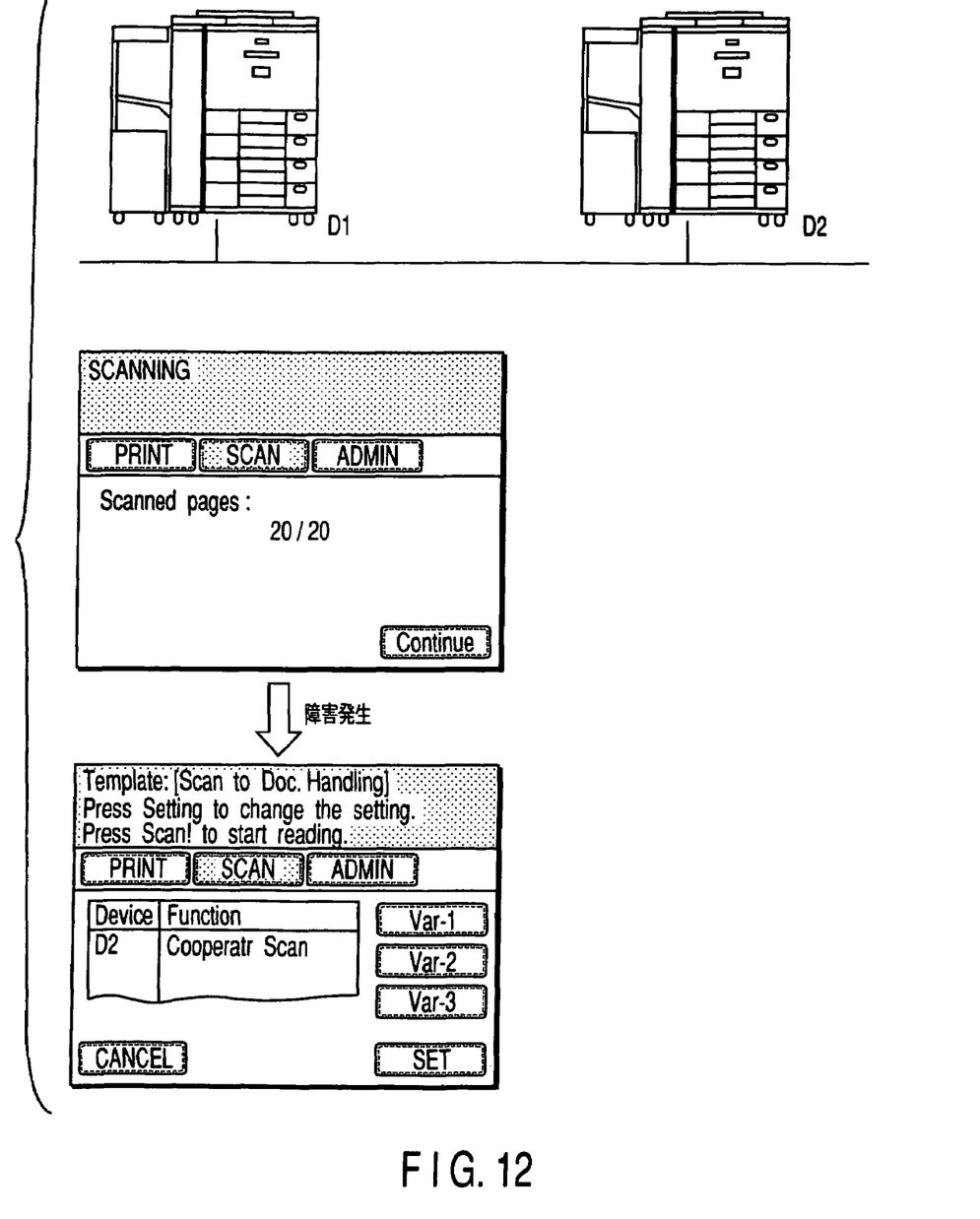
FIG. 12 is a view showing a case of the embodiment, where one or another failure occurs during an input operation, making it impossible to continue the input operation any more.

First, it is assumed that the D1 and D2 are MFP having similar performances regarding input and output, and the D2 can be replaceable for the network device control function of the D1. Now, the user tries to enter a document by the D1, and register it as a job. In this case, the user has not instructed a divided input like that described above with reference to the first embodiment. It is also assumed that one failure or another (e.g., over capacity of the storage unit 16 of the D1) occurs during the input by the D1, making it impossible to continue the input operation by the D1 any more. In this case, the network device control function of the D1 can replace the D1 present on the network to search a device, which enables continuous job registration to be carried out. A list of replaceable devices searched is displayed on the display unit 12 of the D1, enabling the user to select a device to continuously carry out a registration operation. In the described case, the D2 is selected, and instructed to continuously carry out a divided input operation (see FIG. 12).

For such divided input instruction, the following variations are possible depending on the methods of divided input operations.

Var-1 is a method of performing a dispersed input operation by reversing other document input and output devices, and simultaneously using a plurality of devices; Var-2 a method of automatically preparing a template inheriting the setting information of an original template, selecting document input and output devices to cooperatively operate, and then transferring the template to the job management function of each of the selected devices; and Var-3 a method of adding information indicating the continued operation of divided input to the job itself, and registering it.

When the user instructs a divided input operation to be Var-1 in the operation unit 13 of the D1, a list of document input and output devices controlled to cooperatively operate is displayed on the display unit 12 of the D1. Then, the user selects a proper device from the list. In the described case, for example the D2 is selected. The D2 is notified of the cooperative operation request made at the Var-1 through the communication unit 17. At the same time, the setting information of the template previously selected at the D1 is also notified.

Thus, at the D2, a job attribute common to the D1 can also be provided. For example, setting information to be registered in the specific folder of the document handling function, or password information when there is security set for the user of the template, is notified. When there is security set for the template, a screen is displayed on the display unit 12 of the D2 to request a password. In addition, when a password identical to authentication at the D1 is entered, template information is displayed understanding that it has been authenticated.

When the start of an input operation is instructed by the operation unit 13 of the D2, the input operation is started at the input unit 10 of the D2. The documents divided and entered are registered as one job J3 in the document handling function of the D1.

When the user instructs a divided input operation to be Var-2 in the operation unit 13 of the D1, a list of document input and output devices, to which template information can copied/transferred, is displayed on the display unit 12 of the D1. Then, the user selects a proper device from the list. For example, the D2 is selected. The D2 is notified of the cooperative operation request made at the Var-2 through the communication unit 17. At the same time, a template previously selected at the D1 is copied and transferred to the D2.

Thus, at the D2, a job attribute common to the D1 can also be provided. For example, setting information to be registered in the specific folder of the document handling mechanism, or password information when there is security set for the use of the template, is notified. If there is security set for the template, when the template transferred to start the input operation of the D2 is selected, a screen is displayed on the display unit 12 of the D2. When a password identical to authentication at the D1 is entered, template information is displayed understanding that it has been authenticated. Then, when the start of the input operation is instructed after the selection of the template transferred by the operation unit 13 of the D2, the input operation is started at the input unit 10 of the D2. The documents divided and entered are registered as one job J5 in the specific document handling function on the network. When the templates are copied/transferred to the plurality of document input and output devices, since the completion of a job at a predetermined document input and output device makes unnecessary the templates transferred to the other devices, these templates are automatically deleted.

When the user instructs a divided input operation to be Var-3 in the operation unit 13 of the D1, the job management function of the D1 adds information indicating the continued operation of the job divided input. When the user carries out additional registration continuously for the job at the D2 later, the D2 obtains information regarding a job to be additionally registered from the D1. Then, a list of jobs to be additionally registered is displayed on the display unit 12 of the D2. In addition, if jobs to be additionally registered are present in the other connected document input and output devices, these jobs are also displayed in the list.

Then, the user selects a proper job from the list. In the described case, J6 is selected. To continue the input operation at the D2, the setting information of the template selected when the first job registration has been carried out at the D1 is applied. Thus, at the D2, a job attribute common to the D1 can also be provided. For example, setting information to be registered in the specific folder of the document handling function, or password information when there is security set for the use of the template, is notified. If there is security set for the template, when the job J6 is selected to perform the input operation at the D2, a screen is displayed on the display unit 12 to request a password. When a password identical to authentication at the D1 is entered, template information is displayed understanding that it has been authenticated. When the start of the input operation is instructed after the selection of a job by the operation unit 13 of the D1, the input operation is started at the input unit 10 of the D2.

As apparent from the foregoing, according to the embodiments of the present invention, the dispersed input operation from the plurality of devices facilitates the input and registration of sheets. The utilization of the characteristics of the input device enables the content characteristics of sheets to be reflected during the input and registration of the sheets. Moreover, the management of jobs entered from the plurality of devices facilitates integration thereof and, even if a failure occurs, processing can be easily resumed based on the managed information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for inputting and outputting a document by dividing the document into a plurality of portions, and converting the document into data, the system comprising a plurality of document input and output devices connected through a network, a first document input and output device of the document input and output devices comprising:

a division input instruction unit configured to give an instruction for causing a document to be divided into a plurality of bundles, and then the bundles to be entered;

a device specifying unit configured to specify a second document input and output device of the input and output devices, which is to be caused to enter a bundle which has not been entered to the first document input and output device;

a preparation unit configured to prepare a template for defining a job of the first document input and output device, and a template for continuing a job registration operation, for the second document input and output device specified by the device specifying unit;

an execution instruction unit configured to give an instruction for one of at least first, second and third execution modes, in which an input operation is dividedly performed by using the second document input and output device;

a registration unit configured to acquire information regarding a job executed by the first document input and output device and a job executed by the second document input and output device, and register the jobs as a single job; and a deletion unit configured to cause the second document input and output device to delete the template prepared for the second document input and output device, when the execution of the job is continued by the second document input and output device, and the job is completed, wherein in the first execution mode, the first and second document input and output devices simultaneously execute the input division, in the second execution mode, information of the template for the first document input and output device is transferred to the second document input and output device and the second document input and output device executes the job common to the job of the first document input and output device, and in the third execution mode, the second document input and output device executes a job to be added continuously with the job executed by the first document input and output device.

2. The system according to claim 1, wherein the template includes ID information for security.

3. The system according to claim 1, wherein each of the plurality of document input and output devices includes a display unit configured to indicate that of those document input and output devices of the plurality of document input and output devices, which process the plurality of bundles.

4. The system according to claim 1, wherein the first document input and output device is a device which performs input/output processing in black and white, and the second document input and output device is a device which performs input/output processing in color.

5. A system for inputting and outputting a document by dividing the document into a plurality of portions, and converting the document into data, the system comprising a plurality of document input and output devices connected through a network, a first document input and output device of the document input and output devices comprising:

a division input instruction unit configured to give an instruction for causing a document to be divided into a plurality of bundles, and then the bundles to be entered;

a device specifying unit configured to specify a second document input and output device of the document input and output devices, which is to be caused to enter a bundle which has not been entered to the first document input and output device;

an execution instruction unit configured to give, an instruction for one of at least first, second and third execution modes, in which an input operation is dividedly performed by using the second document input and output device, when the first document input and output device becomes unable to perform the input operation;

a preparation unit configured to prepare a template for defining a job of the first document input and output device, and a template for continuing registration of a job, for the second document input and output device specified by the device specifying unit;

an indication unit configured to indicate that a job being executed by the first document input and output device is incomplete;

a recording unit configured to record a state where registration of the job is incomplete; and a communication unit configured to transmit information indicating incompletion of registration of the job to the second document input and output device, and causing the second document input and output device to continue to execute the job registration operation;

a registration unit configured to acquire information regarding the job executed by the first document input and output device and a job executed by the second document input and output device, and register the jobs as a single job; and a deletion unit configured to cause the second document input and output device to delete the template prepared for the second document input and output device, when the execution of the job is continued by the second document input and output device, and the job is completed, wherein in the first execution mode, the plurality of document input and output devices other than the first document input and output device simultaneously execute the input division, in the second execution mode, information of the template for the first document input and output device is transferred to the second document input and output device and the second document input and output device executes the job common to the job of the first document input and output device, and in the third execution mode, the second document input and output device executes a job to be added continuously with the job executed by the first document input and output device.

6. The system according to claim 5, wherein the template includes ID information for security.

7. The system according to claim 5, wherein each of the plurality of document input and output devices includes a display unit configured to indicate that of those document input and output devices of the plurality of document input and output devices, which process the plurality of bundles.

8. The system according to claim 5, wherein the first document input and output device is a device which performs input/output processing in black and white, and the second document input and output device is a device which performs input/output processing in color.

9. A system for inputting and outputting a document by dividing the document into a plurality of portions, and converting the document into data, the system comprising a plurality of document input and output devices connected through a network, a first document input and output device of the document input and output devices comprising:

means for giving an instruction for causing a document to be divided into a plurality of bundles, and then the bundles to be entered;

means for specifying a second document input and output device of the input and output devices, which is caused to enter a bundle which has not been entered to the first document input and output device;

means for preparing a template for defining a job of the first document input and output device, and a template for continuing a job registration operation, for the second document input and output device specified by the specifying means;

means for giving an instruction for one of at least first, second and third execution modes, in which an input operation is dividedly performed by using the second document input and output device;

means for acquiring information regarding a job executed by the first document input and output device and a job executed by the second document input and output device, and registering the jobs as a single job; and means for causing the second document input and output device to delete the template prepared for the second document input and output device, when the execution of the job is continued by the second document input and output device, and the job is completed, wherein in the first execution mode, the first and second document input and output devices simultaneously execute the input division, in the second execution mode, information of the template for the first document input and output device is transferred to the second document input and output device and the second document input and output device executes the job common to the job of the first document input and output device, and in the third execution mode, the second document input and output device executes a job to be added continuously with the job executed by the first document input and output device.

10. The system according to claim 9, wherein the template includes ID information for security.

11. The system according to claim 9, wherein each of the plurality of document input and output devices includes means for indicating that of those document input and output devices of the plurality of document input and output devices, which process the plurality of bundles.

12. The system according to claim 9, wherein the first document input and output device is a device which performs input/output processing in black and white, and the second document input and output device is a device which performs input/output processing in color.

13. An inputting and outputting method of a system for inputting and outputting a document by dividing the document into a plurality of portions, and converting the document into data, the system comprising a plurality of document input and output devices connected through a network, the inputting and outputting method comprising:

giving an instruction for causing a document to be divided into a plurality of bundles, and then the bundles to be entered, at a first document input and output device of the document input and output devices;

specifying a second document input and output device of the document input and output devices, which is to be caused to enter a bundle which has not been entered to the first document input and output device, at the first document input and output device;

preparing a template for defining a job of the first document input and output device, and a template for continuing registration of a job, for the specified second document input and output device, at the first document input and output device;

giving an instruction for one of at least first, second and third execution modes, in which an input operation is dividedly performed by using the second document input and output device;

acquiring information regarding a job executed by the first document input and output device and a job executed by the second document input and output device, and registering the jobs as a single job, at the first document input and output device; and causing the second document input and output device to delete the template prepared for the second document input and output device, at the first document input and output device, when the execution of the job is continued by the second document input and output device, and the job is completed, wherein in the first execution mode, the first and second document input and output devices simultaneously execute the input division, in the second execution mode, information of the template for the first document input and output device is transferred to the second document input and output device and the second document input and output device executes the job common to the job of the first document input and output device, and in the third execution mode, the second document input and output device executes a job to be added continuously with the job executed by the first document input and output device.

14. The system according to claim 13, wherein the template includes ID information for security.

15. The method according to claim 13, wherein each of the plurality of document input and output devices includes a display unit configured to indicate that of those document input and output devices of the plurality of document input and output devices, which process the plurality of bundles.

16. The method according to claim 13, wherein the first document input and output device is a device which performs input/output processing in black and white, and the second document input and output device is a device which performs input/output processing in color.

* * * * *